United States Patent [19]
Bondarenko et al.

[11] Patent Number: 6,018,578
[45] Date of Patent: *Jan. 25, 2000

[54] CALL AND DATA CORRESPONDENCE IN A CALL-IN CENTER EMPLOYING VIRTUAL RESTRUCTURING FOR COMPUTER TELEPHONY INTEGRATED FUNCTIONALITY

[75] Inventors: Oleg Bondarenko, San Francisco; Andre Petrov; Igor Neyman, both of Palo Alto; Paul Karpenko; Valeriy Issayev, both of San Bruno, all of Calif.

[73] Assignee: Genesys Telecommunications Laboratories, Inc., San Francisco, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,665

[22] Filed: Apr. 3, 1997

[51] Int. Cl.[7] ..................................... H04M 3/42
[52] U.S. Cl. .................. 379/265; 379/93.23; 379/207
[58] Field of Search .................. 379/265, 266, 379/209, 210, 211, 212, 201, 219, 220, 225, 233, 234, 231, 207, 88.12, 93.17, 93.23; 370/270

[56] References Cited

U.S. PATENT DOCUMENTS

| | | | |
|---|---|---|---|
| 4,290,141 | 9/1981 | Anderson et al. | 455/2 |
| 4,320,256 | 3/1982 | Freeman | 179/6.04 |
| 4,345,315 | 8/1982 | Cadotte et al. | 364/900 |
| 4,355,207 | 10/1982 | Curtin | 179/18 |
| 4,355,372 | 10/1982 | Johnson et al. | 364/900 |
| 4,439,636 | 3/1984 | Newkirk et al. | 179/7.1 |
| 4,451,700 | 5/1984 | Kempner et al. | 179/2 |
| 4,489,438 | 12/1984 | Hughes | 381/51 |
| 4,517,410 | 5/1985 | Williams et al. | 179/6.04 |
| 4,521,643 | 6/1985 | Dupuis et al. | 179/2 |
| 4,523,055 | 6/1985 | Hohl et al. | 179/2 |
| 4,528,643 | 7/1985 | Freeny, Jr. | 364/900 |
| 4,539,435 | 9/1985 | Eckmann et al. | 179/2 |
| 4,559,415 | 12/1985 | Bernard et al. | 179/2 |
| 4,566,030 | 1/1986 | Nickerson et al. | 358/84 |
| 4,577,062 | 3/1986 | Hilleary et al. | 179/2 |
| 4,577,067 | 3/1986 | Levy et al. | 179/99 |
| 4,578,700 | 3/1986 | Roberts | 358/84 |
| 4,580,012 | 4/1986 | Matthews et al. | 179/18 |
| 4,584,602 | 4/1986 | Nakagawa | 358/84 |
| 4,587,379 | 5/1986 | Masuda | 179/2 |
| 4,598,367 | 7/1986 | DeFrancesco et al. | 364/408 |
| 4,603,232 | 7/1986 | Kurland et al. | 179/2 |
| 4,611,094 | 9/1986 | Asmuth et al. | 179/7.1 |
| 4,625,276 | 11/1986 | Benton et al. | 364/408 |
| 4,630,200 | 12/1986 | Ohmae et al. | 364/405 |
| 4,630,201 | 12/1986 | White | 364/408 |
| 4,634,809 | 1/1987 | Paulsson et al. | 379/91 |
| 4,649,563 | 3/1987 | Reskin | 379/97 |
| 4,654,482 | 3/1987 | DeAngelis | 379/95 |
| 4,667,287 | 5/1987 | Allen et al. | 364/200 |

(List continued on next page.)

OTHER PUBLICATIONS

Margie Semilof "Call Centers Go On-Line" Communications Week No Date Available.

*Primary Examiner*—Scott Wolinsky
*Attorney, Agent, or Firm*—Donald R. Boys; Central Coast Patent Agency

[57] ABSTRACT

An agent station for a call-in center has a telephone for an agent's use connected by a communication link with a computer workstation including a video display unit (VDU) adapted for monitoring origination information for calls received on the telephone. In a preferred embodiment the computer workstation is connected on a local area network (LAN) to a processor running and instance of a telephony server (T-Server) application having access to a database storing data pertaining to callers, and the computer workstation reports call-origination data to the T-Server, which uses the data to correlate data to be retrieved from the database and displayed on the VDU.

10 Claims, 3 Drawing Sheets

U.S. PATENT DOCUMENTS

| | | | |
|---|---|---|---|
| 4,674,044 | 6/1987 | Kalmus et al. | 364/408 |
| 4,696,029 | 9/1987 | Cohen | 379/92 |
| 4,697,282 | 9/1987 | Winter et al. | 379/67 |
| 4,756,020 | 7/1988 | Fodale | 379/112 |
| 4,757,267 | 7/1988 | Riskin | 379/113 |
| 4,763,191 | 8/1988 | Gordon et al. | 358/86 |
| 4,785,408 | 11/1988 | Britton et al. | 364/513.5 |
| 4,788,715 | 11/1988 | Lee | 379/84 |
| 4,812,843 | 3/1989 | Champion, III et al. | 340/925 |
| 4,866,756 | 9/1989 | Crane et al. | 379/88 |
| 4,893,328 | 1/1990 | Peacock | 379/67 |
| 4,896,345 | 1/1990 | Thorne | 379/67 |
| 4,908,850 | 3/1990 | Masson et al. | 379/88 |
| 4,953,204 | 8/1990 | Cuschleg, Jr. et al. | 379/266 |
| 4,972,461 | 11/1990 | Brown et al. | 379/67 |
| 5,001,710 | 3/1991 | Gawrys et al. | 370/110.1 |
| 5,017,917 | 5/1991 | Fisher et al. | 340/825.79 |
| 5,036,535 | 7/1991 | Gechter et al. | 379/210 |
| 5,164,983 | 11/1992 | Brown et al. | 379/265 |
| 5,256,863 | 10/1993 | Furguson et al. | 235/383 |
| 5,261,096 | 11/1993 | Howarth | 365/650 |
| 5,278,977 | 1/1994 | Spencer et al. | 395/575 |
| 5,280,625 | 1/1994 | Howarter et al. | 395/200 |
| 5,343,477 | 8/1994 | Yamada | 371/8.2 |
| 5,392,400 | 2/1995 | Berkowitz et al. | 395/200 |
| 5,402,474 | 3/1995 | Miller et al. | 379/93.12 |
| 5,444,774 | 8/1995 | Friedes | 379/266 |
| 5,455,903 | 10/1995 | Jollissaint et al. | 395/155 |
| 5,528,678 | 6/1996 | Kaplan | 379/201 |
| 5,530,744 | 6/1996 | Charlambous et al. | 379/265 |
| 5,619,557 | 4/1997 | Van Berkum | 379/88.16 |
| 5,621,789 | 4/1997 | McCalmont et al. | 379/265 |
| 5,631,954 | 5/1997 | Evans et al. | 379/201 |
| 5,694,463 | 12/1997 | Christie et al. | 379/230 |
| 5,699,416 | 12/1997 | Atkins | 379/127 |
| 5,724,418 | 3/1998 | Brady | 379/212 |
| 5,742,675 | 4/1998 | Kilander et al. | 379/265 |
| 5,778,060 | 7/1998 | Otto | 379/265 |
| 5,864,614 | 1/1999 | Farris et al. | 379/207 |

CALL AND DATA CORRESPONDENCE IN A CALL-IN CENTER EMPLOYING VIRTUAL RESTRUCTURING FOR COMPUTER TELEPHONY INTEGRATED FUNCTIONALITY

FIELD OF THE INVENTION

The present invention is in the area of telephone call processing and switching, and pertains more particularly to intelligent call-routing systems with Computer Telephony Integration (CTI).

CROSS-REFERENCE TO RELATED APPLICATIONS

The present patent application is related to copending patent applications Ser. Nos. 08/797,406; 08/797,407; 08/797,408; 08/797,417; 08/797,418; 08/797,419; and 08/797,420, which applications were filed on Feb. 10, 1997 each have a common inventor to the present application and are incorporated herein in their entirety by reference.

BACKGROUND OF THE INVENTION

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving customers of such as large insurance organizations. In some cases organizations develop and maintain their own telephony operations with purchased or leased equipment, and in many other cases, companies are outsourcing such operations to firms that specialize in such services.

A relatively small technical support operation serves as an example in this specification of the kind of applications of telephone equipment and functions to which the present invention pertains and applies. Consider such a system having just one, or at most a few call-in centers, as opposed to a large organization having country-wide matrix of call-in centers. One of the differences that might be noticed in this example is that such a relatively small operation will be less likely to have an on-premises telephony switch, and would thus rely on an off-premises switch. In the patent applications listed above as related to the present application call-in centers were described having a telephony switch as a part of the Customer Premises Equipment (CPE), and inventions are taught and claimed in those applications related to such relatively large-scale systems. In the present application an invention in various aspects is taught and claimed relative to call-in centers having no telephony switch as a part of the CPE.

It is generally known in the art to provide computer functions as a part of telephone switching equipment, although there are many inventions that have been patented relative to such functionality, and there are many patent applications pending related to such equipment, including the pending applications listed above. It is also known in some later technical development to integrate computers with telephony switches, and several such applications are known to the inventors and are disclosed and taught in the related patent applications to which reference has been made. Such computer enhancement is known in the art as Computer Telephone Integration (CTI), and is in the realm of CTI that the present invention also applies in a broad sense.

Very broadly speaking, it is desirable in the art wherever call-in centers are operated to provide quick and efficient service to callers (although this may not be always readily apparent to the callers, who still in most such systems find themselves stuck on hold in queues for long periods). There is nevertheless much inventive work being done to enhance and improved such systems, and much of this development is in the area of CTI, as might be expected. It is in this area that the present invention applies, and it is an object of the present invention to provide enhanced CTI functionality for call-in centers having no telephony switch as a part of the CPE, wherein calls are routed to telephones at such a call-in center by one or more telephony switches not a part of the CPE.

SUMMARY OF THE INVENTION

In a preferred embodiment of the present invention a telephony call-in center is provided, comprising a plurality of agent stations, individual ones of the agent stations having a telephone and a computer workstation including a video display unit (VDU), the telephone and computer workstation connected by a data link; a local area network (LAN) connecting at least some of the computer workstations at the agent stations; and a first computer processor including an instance of a telephony server (T-Server), the computer processor connected on the LAN and having access to a database. The computer workstation is adapted to retrieve origination data for incoming calls at the telephone and to report the origination data to the T-Server, and the T-Server is adapted to use the origination data to correlate the caller with further data retrieved from the database for display on the VDU.

In many embodiments the T-Server is adapted to service calls from specific Service Control Points (SCPs) and to block display of data at agent station VDUs for any call not identified as originating at one of the specific SCPs. One or more of the computer workstations are personal computers (PCs), and the communication link between telephones and computer workstations is a PC-compatible serial data link.

In an aspect of the invention a telephone call-routing system is provided, comprising a call-in center comprising a plurality of agent stations, individual ones of the agent stations having a telephone and a computer workstation including a video display unit (VDU) connected by a communication link, with a plurality of the computer workstations connected to one another, to a first processor running an instance of a telephony server (T-Server), ad to a database on a local area network (LAN); and a call-routing center comprising a telephony switch adapted to switch telephone calls to the telephones at the call-in center, the telephony switch coupled to a second processor running an instance of the T-Server. The computer workstation is adapted to retrieve origination data for incoming calls at the telephone and to report the origination data to the T-Server, and wherein the T-Server is adapted to use the origination data to correlate the caller with further data retrieved from the database for display on the VDU. The call-routing system may have the T-Server adapted to service calls from specific Service Control Points (SCPs) and to block display of data at agent station VDUs for any call not identified as originating at one of the specific SCPs.

In another aspect of the invention an agent station for a call-in center is provided, comprising a computer workstation having a first communication port and a local area network (LAN) adapter; a telephone having a telephone line port and a second communication port; and a communication link connecting the computer workstation and the telephone between the first and the second communication ports. The computer workstation is adapted to retrieve origination data for calls to the connected telephone via the communication link, and to report the origination data on a LAN via the LAN adapter.

In yet another aspect a method for correlating displayed data with incoming calls at a call-in center is provided, comprising steps of (a) connecting individual telephones at the call-in center by a communication link to individual computer workstations; (b) connecting each telephone-connected computer workstation on a local area network (LAN) to a processor connected on the LAN and running a telephony server (T-Server) having access to a database storing data to be displayed; (c) monitoring origination information of incoming calls by the computer workstations; (d) providing the origination information over the LAN to the T-Server running on the LAN-connected processor; and (e) using the origination information via the T-Server to correlate data to be displayed with the incoming calls.

BRIEF DESCRIPTION OF THE DRAWING FIGURES

DESCRIPTION OF THE PREFERRED EMBODIMENTS

Figure 1:
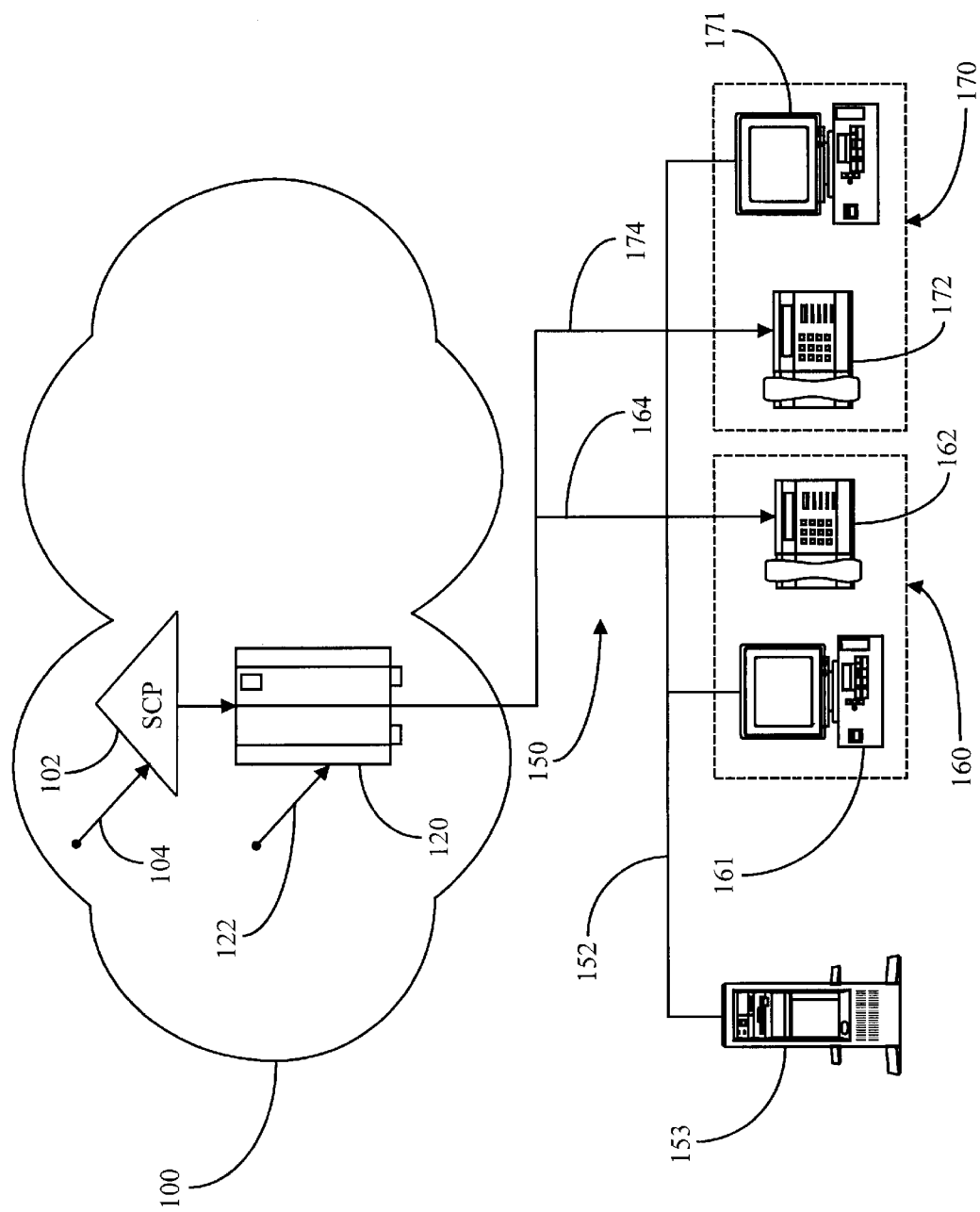
FIG. 1 is a block diagram of a call-routing system in the prior art.

To help create a context for a detailed description of preferred embodiments of the present invention, attention is first directed to FIG. 1, which is a block diagram of a call-routing system in the prior art. In the system of FIG. 1 a call-in center 150 is illustrated having two telephones 162 and 172. As was described above in the background section, the present invention is particularly adaptable to such call-in centers wherein a telephony switch is not a part of the equipment at the call-in center, thus no telephony switch is shown in FIG. 1 at call-in center 150.

It will be apparent to those with skill in the art that there may be just one phone in call-in center, or there may be several more than the two shown. Two telephones is an arbitrary choice for purposes of illustration and description.

It is common and desirable at call-in centers for agents who man the phones to have at hand a personal computer (PC) or a data terminal of some description including a video display and processor. Access to such a computerized system allows the agent to recall and display data pertaining to a caller, and also other information of use in dealing with and helping caller, such as technical information about products and product use. Although several types of such data terminals are known, PCs are assumed here for purposes of description and illustration. A PC 161 with a display is shown at hand for an agent using telephone 162 and a PC 171 is shown proximate telephone 172 for use by an agent at telephone 172.

In a very simple system there may be just one telephone and one PC proximate the telephone, therefore just a single equipped agent constituting the call-in center. In the system of FIG. 1 having two telephones, there are also two PCs. Each PC and associated telephone is considered here to constitute an agent station. Agent station 160 comprises telephone 162 and PC 161, and agent-station 170 comprises telephone 172 and PC 171.

In systems of the sort depicted by FIG. 1, having two or more agent stations, it is desirable that the PCs be connected in a Local Area Network (LAN), and this connectivity is shown in FIG. 1 with PCs 161 and 171 connected on a LAN 152 wherein a data file server 153 is also connected. Data file server 153 in this system is the repository of customer data and the like accessible to agents manning the phones. Though not shown in FIG. 1 it will be apparent to those with skill in the art that there may be other servers on the LAN or elsewhere in the network as known in the art.

Telephone calls in the system of FIG. 1 are provided to telephone 162 on line 164 and to telephone 172 on line 174 from essentially anywhere represented by network cloud 100. Cloud 100 could represent a relatively small local calling area, a regional area, a single phone company or even the phone system of the entire planet. Calls are forwarded by telephony switches represented by telephony switch 120.

Calls 104 intended specifically for call-in center 150 typically are received at Service Control Points (SCP) represented by SCP 102, which are organized typically with one or more 800 numbers or the like. Calls received and processed at SCP 102 are forwarded to switch 120 which routes the calls to whatever area code and number is assigned to telephones 162 and 172. Other calls 122 may also come into telephony switch 120 and be routed to call-in center 150. As is known in the art, SCP 102 is also a telephony switch.

Also as is known in the art, there may be equipment associated with SCP 102 to provided some additional functionality, such as an adjunct processor and an intelligent peripheral. For simplicity's sake these are not shown in FIG. 1., but FIG. 1 may be considered as typical of many prior art systems. In the rather simple system of the prior art represented by FIG. 1 some data (such as caller ID for example, and Dialed Number Information Service {DNIS}), may be associated with calls forwarded to call-in center 150. Such data to be useful in the system of FIG. 1 must be received by specialized equipment, such as familiar caller-ID boxes or telephone sets adapted to use the information being sold to people for home and business use.

Figure 2:
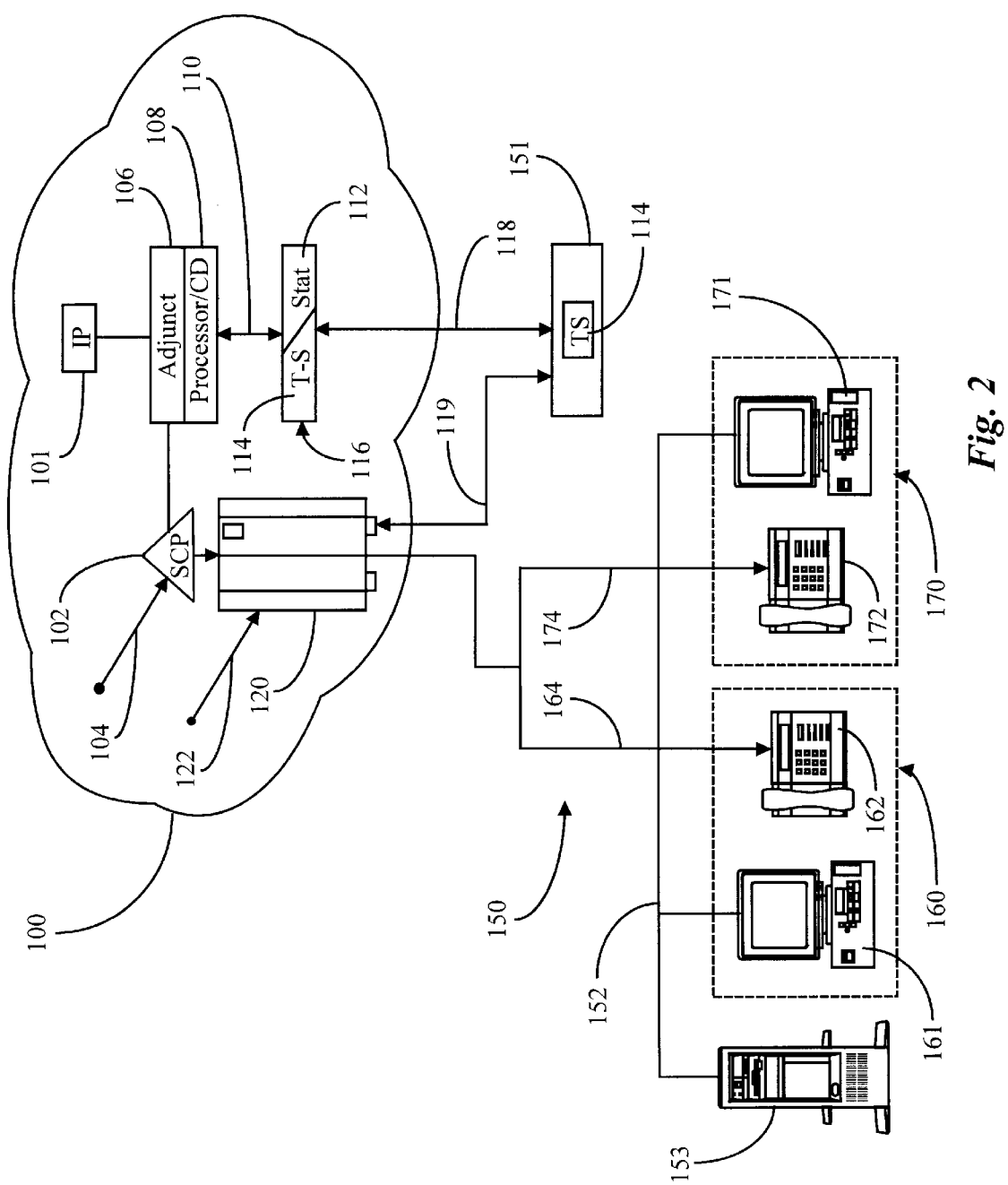
FIG. 2 is a block diagram of a call-routing and call-in system according to embodiments of inventions known to the present inventors.

Attention is now directed to FIG. 2, wherein a call-in system known to the present inventors is illustrated. In this system SCP 102 receiving calls 104 intended for call-in center 150 has a connection to an adjunct processor 106 in communication with both an intelligent peripheral 101 and a call-distribution processor 108. There is further a processor 116 connected by a two-way communication link to call-distribution processor 110. Processor 116 comprises an instance of a unique application termed by the inventors a Telephony Server 114, or T-Server, and a Statistical Server (Stat-Server) 112. T-Server 114 and functions provided by the T-Server are described in detail in the related patent applications listed above and incorporated herein by reference.

In the system of FIG. 2 a processor 151 is provided at call-in center 150, running a second instance of T-Server application 114. Processor 151 is coupled to processor 116 in network cloud 100 by a network link 118, and to LAN 152 by a network adapter. There is in addition a CTI connection 119 between telephony switch 120 in network cloud 100 and processor 151 at call-in center 150. CTI connection 119 may be an ISDN link or other data-type connection allowing transfer of CTI data and commands.

In the system of FIG. 2 information garnered in initial processing with use of IP 101 may be provided by T-Server 114 at processor 116 to T-Server 114 running on processor 151 at the call-in center. This data can be used, then, ahead of a routed call, to, for example, to extract further data regarding a caller from a customer data base in file server 153, and to provide the transferred and retrieved data at the PC display, such as PC 161, proximate the telephone to which a call has been routed, for use by the agent manning that telephone.

Further, CTI transactional data retrieved from switch 120 (line busy, line available, and the like), may be provided to T-Server 114 at processor 116, and in some cases in raw or processed form to Stat-Server 112 to be used in routing by CD processor 108. Many other functions described in the related applications listed above may now also be accomplished. Still further, T-Server 114 running on processor 151 can issue CTI commands to switch 120 in the network cloud via CTI link 119.

Although the system of FIG. 2 may be used to provide many CTI functions, there is a great dependence on telephony switch 120. Some older switches are not capable of CTI functions and data sharing, and some others are very limited in their functions. Moreover, the organization that provides a call-in center under these circumstances has no control over the switches in the network cloud, and it may not be practical for such an organization to purchase and install an expensive CTI-capable switch on the premises of the call-in center. What is needed is an apparatus and methods that will provide CTI functionality in the absence of a workable CTI link, such as link 119 in FIG. 2.

Virtual CTI Link

Figure 3:
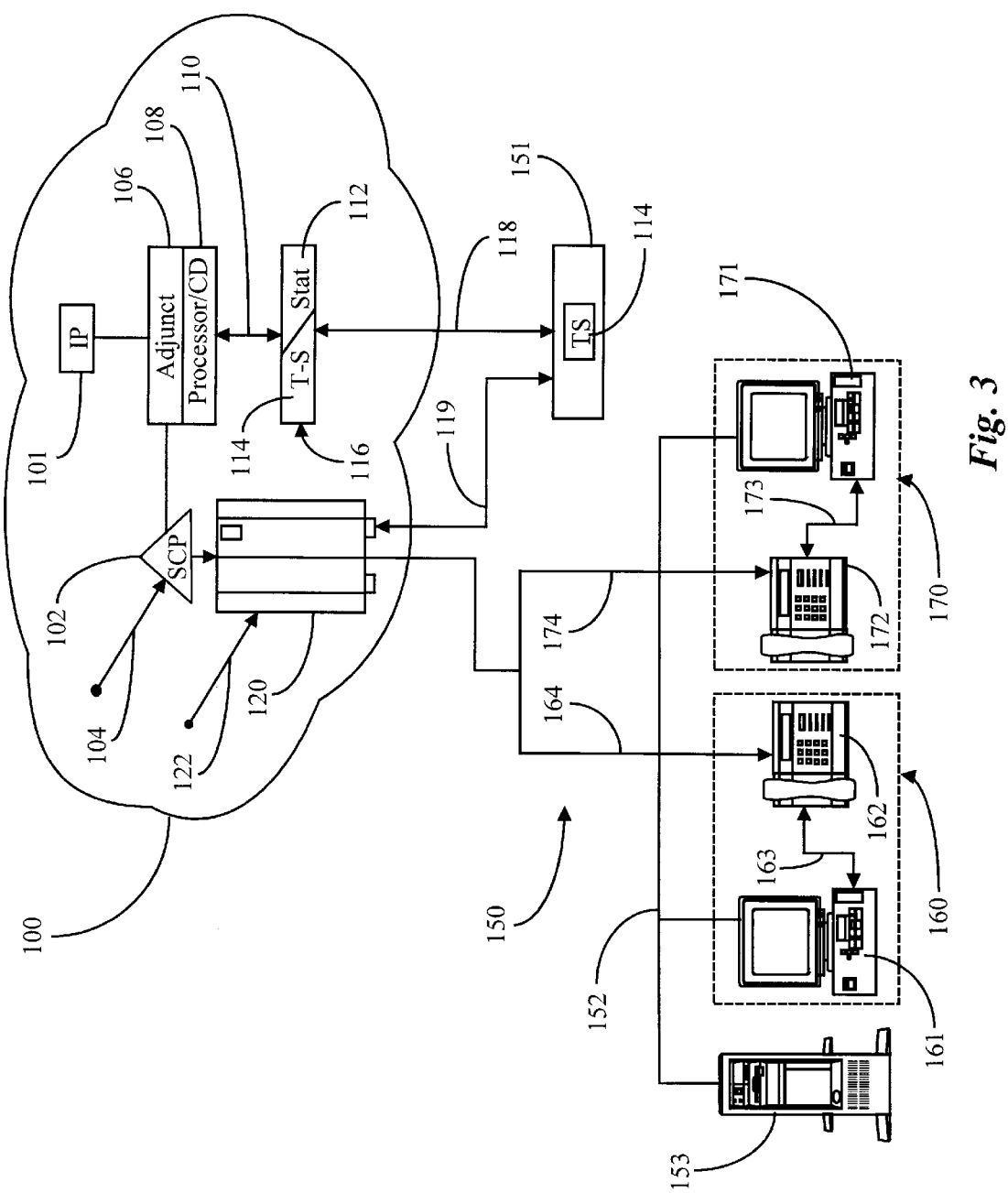
FIG. 3 is a block diagram of a call and information routing and call-center system according to an embodiment of the present invention.

FIG. 3 is a block diagram of a call and information routing and call-center system according to an embodiment of the present invention. The system of FIG. 3 has all of the connectivity and functionality of the system of FIG. 2, plus a data connection between each telephone in the call-in center and the associated PC. For example, in FIG. 3, PC 161 is connected to telephone 162 by link 163, and PC 171 is connected to telephone 172 by data link 173. Moreover, as previously described, each PC is connected on LAN 152, which also connects to file server 153 and to processor 151 running an instance of T-Server 114.

There are a number of different ways a telephone and PC may be connected, such as by a serial port and circuitry in the telephone and operating code in the PC such that the PC may monitor transactions of the telephone, including on-hook, off-hook, incoming caller-ID, ringing instance, and so forth. The PC via the data link may also exercise control over telephone functions. With this unique connectivity and adaptation, assuming all of the telephones in a call-in center are thus connected and adapted, T-Server 114 running on processor 151 may acquire in aggregate all of the information otherwise available from switch 120 via CTI connection 119. T-Server 114 on processor 151 may then perform as though a fully workable CTI connection 119 to switch 120 is established.

Call and Data Correspondence

One of the important functions performed is identification of callers, retrieval of data relating to callers, and transmittal of such data to be displayed at the PC associated with each telephone at each agent station. The advantage to all is readily apparent. The agent fielding a call is thus more prepared to deal with the caller, and will have information readily at hand.

To provide the call and data display functionality desired it is, of course, necessary that a caller's identity be established and the caller's correct data be retrieved for display. There are some instances in the system depicted in FIG. 3 and described herein, wherein such correspondence may be a problem. Consider, for example, the circumstance wherein an original call has been routed to telephone 162. The origination of the call and caller ID are not available in the system of FIG. 3 (with a non-functioning link 119) until the call is connected to telephone 162. At that point the necessary information is transferred to T-Server 114 at processor 151, and data specific to the caller may be retrieved and displayed at PC 161.

Consider now the further circumstance that after the agent answers and the data retrieval begins, the original caller hangs up or is otherwise disconnected, and a second call 122, a random call, entering the system not through SCP 102 but directly into switch 120, goes to telephone 162. This circumstance could occur in a number of different ways, including a misdialed or misrouted call. There are also other sequences of events that could result in the same mismatch between call and data. Unless some action is taken, the data will be retrieved and displayed, although there will no correspondence between the data and the caller.

In this circumstance the origination information, which may be such as caller ID information or DNIS information, for the second (random) call will not indicate the call originates at SCP 102. In an embodiment of the present invention, origination data transmitted to T-Server 114 at processor 151 indicating the call last received was not through a valid SCP will cause any data being prepared for display at the agent station to be halted. In some embodiments, depending on the capability of switch 120, T-Server 114 on processor 151 may cause such non-SCP calls to be disconnected and/or rerouted, by command over link 119.

Voice Extensions Through Integrated Agent Workstations

The direct connection of a telephone to a PC connected on a LAN to a processor with an operating T-Server provides a platform for a number of voice extensions useful in the overall process of customer service through call-in centers. Several such voice extensions in embodiments of the present invention are described herein below.

Call recording is a major need in customer service operations of the sort described herein, especially in operations dealing with financial markets and utilities. Such recording operations in current art are typically quite expensive to implement and difficult to manage. In an embodiment of the present invention an improved call recording facility is provided by virtue of the connection of the telephone to the PC by data link, and the functionality afforded through LAN 152 and code as a part of T-Server 114. In this embodiment a digital voice rendition of both parties to a call is transmitted on link 163 (for example) to PC 161.

In one embodiment of the present invention all calls are recorded, subject of course to local laws governing such matters, and provision is made for selective archiving of recorded conversations. The recording is all digital, and may be accomplished in a number of ways, utilizing a number of commercially available hardware and software entities, such as those marketed under the name SoundBlaster™. The LAN connection and availability of data servers such as server 153 provide for the rather large amount of digital data needed for such a recording operation. In this embodiment organization of the recorded database can be done in a variety of ways, categorized by agent, by subject, by product, and so on, and relational cross-referencing may be done as well, providing a well of information not before available in such call-in centers. In addition interactive search and retrieve functionality, and interactive report generation is provided. In another embodiment of the invention digital voice recording is provided on demand, under control of the resident agent and/or the agent's supervisor. It will be apparent to those with skill in the art that there are many different schemes that may be employed for digital voice recording, using the uniquely connected and managed apparatus of the present invention.

In other embodiments of the present invention voice playback is provided, with pre-recorded massages played to a caller under agent or Host control. Such pre-recorded messages may be recorded by an agent or other person, and stored either locally in the PC or more remotely, such as on a server connected to LAN 152. Such messages can include greetings, mandatory messages required under law in some cases, disclaimers, and all kinds of messages that may be very repetitive for an agent.

In other embodiments of the present invention voice recognition routines are used allowing an agent to invoke displays with spoken initiators on the telephone, recognized in the PC and acted upon either in the PC or through the PC by means of LAN 152 by other servers on the LAN or by T-Server 114. Voice recognition may also be used to detect upselling opportunities in the course of calls at PC connected telephones. Other voice recognition routines are used in embodiments of the invention to detect abusive or threatening speech, and to automatically save calls or portions of calls that match patterns for such speech.

It will be apparent to those with skill in the art that there are many alterations that may be made in the embodiments of the invention herein described without departing from the spirit and scope of the invention. There are, for example, many sorts of communication links and data protocols that may be used, such as several types of LAN functionality, and alternative links for the telephone-to-PC links. There are similarly many ways circuitry may be provided in a telephone to accomplish the features of the present invention herein described, such as two-way voice transmission over the telephone-PC interlink along with transaction monitoring and reporting, as well as control of telephone functions. The nature of the telephones used may vary widely, and the nature of the computers at the agent workstations may vary as well. There are similarly many other alterations that might be made in embodiments described herein, while not straying from the spirit and scope of the invention. The scope of the invention is limited only by the claims below.

What is claimed is:

1. A telephony call-in center, comprising:
a plurality of agent stations, individual ones of the agent stations having a telephone and a computer workstation including a video display unit (VDU), the telephone and computer workstation connected by a communication link;
a local area network (LAN) connecting at least some of the computer workstations at the agent stations; and
a first computer processor including an instance of a telephony server (T-Server) enabled to service calls from specific Service Control Points (SCPs) and to block display of data at agent station VDUs for any call not identified as originating at one of the specific SCPs, the computer processor connected on the LAN and having access to a database;
wherein the computer workstation is enabled to retrieve origination data for incoming calls at the telephone, and to use the origination data to correlate a caller with further data retrieved from the database for display on the VDU.

2. The telephony call-in center of claim 1 wherein one or more of the computer workstations are personal computers (PCs).

3. The telephony call-in center of claim 3 wherein the communication link is a PC-compatible serial data link.

4. The telephony call-in center of claim 1 wherein the computer workstation is adapted to report the origination data to the T-Server, and the T-Server is adapted to correlate the caller with further data retrieved from the database for display on the VDU.

5. A telephone call-routing system, comprising:
a call-in center comprising a plurality of agent stations, individual ones of the agent stations having a telephone and a computer workstation including a video display unit (VDU) connected by a communication link, with a plurality of the computer workstations connected to one another, to a first processor running an instance of a telephony server (T-Server), and to a database on a local area network (LAN); and
a call-routing center comprising a telephony switch adapted to switch telephone calls to the telephones at the call-in center, the telephony switch coupled to a second processor running an instance of the T-Server;
wherein the T-Server services calls from specific Service Control Points (SCPs) and blocks display of data at agent station VDUs for any call not identified as originating at one of the specific SCPs, and the computer workstation retrieves origination data for incoming calls at the telephone and to report the origination data to the T-Server, and wherein the T-Server uses the origination data to correlate a caller with further data retrieved from the database for display on the VDU.

6. The telephone call-routing system of claim 5 wherein one or more of the computer workstations are personal computers (PCs).

7. The telephone call-routing system of claim 6 wherein the communication link is a PC-compatible serial data link.

8. The telephone call-routing system of claim 5 further comprising a computer telephony integration (CTI) link between the first processor and the telephony switch.

9. A method for correlating displayed data with incoming calls at a call-in center, comprising steps of:
(a) connecting individual telephones at the call-in center by a communication link to individual computer workstations having video display units (VDUs);
(b) connecting each telephone-connected computer workstation on a local area network (LAN) to a Computer-Telephony Integration (CTI) processor connected on the LAN and running a telephony server (T-Server) CTI application having access to a database storing data to be displayed, and enabled to service calls from specific Service Control Points (SCPs) and to block display of data at agent station VDUs for any call not identified as originating at one of the specific SCPs;
(c) monitoring origination information of incoming calls by the computer workstations;
(d) providing the origination information over the LAN to the T-Server running on the LAN-connected CTI processor;
(e) using the origination information via the T-Server to correlate data to be displayed at the VDUs with the incoming calls; and
(f) blocking display of data at the individual computer workstation VDUs for any call not identified as originating at the specific SCPs.

10. The method of claim 9 wherein one or more of the computer workstations in step (a) are personal computers (PCs) and the communication link is a PC-compatible serial data link.

* * * * *

UNITED STATES PATENT AND TRADEMARK OFFICE
CERTIFICATE OF CORRECTION

PATENT NO : 6,018,578
DATED : 01/25/2000
INVENTOR(S) : Oleg Bondarenko et al.

It is certified that error appears in the above-identified patent and that said Letters Patent are hereby corrected as shown below:

On the title page:

Inventor "Paul Karpenko" should read "Pavel Karpenko".

Signed and Sealed this

Seventeenth Day of April, 2001

Attest:

NICHOLAS P. GODICI

Attesting Officer

Acting Director of the United States Patent and Trademark Office